(12) United States Patent  (10) Patent No.: US 6,292,142 B1
Pittman                    (45) Date of Patent:    Sep. 18, 2001

(54) LOCKING ASSEMBLY

(75) Inventor: John E. Pittman, Ashland, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/550,754

(22) Filed: Apr. 17, 2000

Related U.S. Application Data

(60) Provisional application No. 60/135,459, filed on May 24, 1999.

(51) Int. Cl.$^7$ ........................................ F16B 7/20
(52) U.S. Cl. ............................ 343/700 MS; 343/775
(58) Field of Search ............... 343/700 MS, 713; 403/349, 316, 353, 319, 79

(56) References Cited

U.S. PATENT DOCUMENTS

| | | | |
|---|---|---|---|
| 4,756,638 | * 7/1988 | Neyret | 403/261 |
| 5,018,901 | * 5/1991 | Ferree et al. | 403/349 |
| 5,597,260 | * 1/1997 | Peterson | 403/319 |
| 5,757,327 | * 5/1998 | Yajima et al. | 343/713 |

* cited by examiner

Primary Examiner—Don Wong
Assistant Examiner—James Clinger
(74) Attorney, Agent, or Firm—Daly, Crowley & Mofford, LLP

(57) ABSTRACT

A locking assembly is provided with a mounting ring having at least one notch and at least one groove having an entrance adjacent to the notch. A locking ring of the assembly has at least one protrusion disposed in the notch of the mounting ring. A retaining ring holds the locking ring and the mounting ring together. The locking ring is normally biased toward a first, locking position in which the protrusion blocks the entrance of the groove and is moveable to a second, engagement position in which the protrusion is urged against the mounting ring to expose the entrance of the groove. The locking assembly is suitable for engaging and locking various devices having at least one tab, such as an RF feed of an antenna system. The device is engaged and locked by moving the device tab against the locking ring protrusion, in order to move the locking ring to the engagement position and by rotating the device relative to the mounting ring to cause the device tab to enter the groove, following which the locking ring is biased toward the locking position.

24 Claims, 11 Drawing Sheets

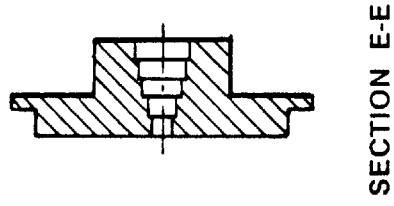
Figure 2I SECTION E-E
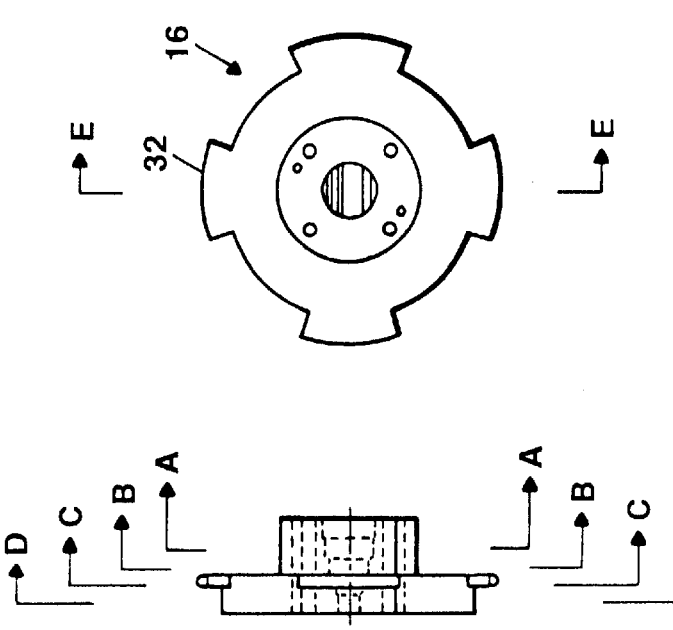
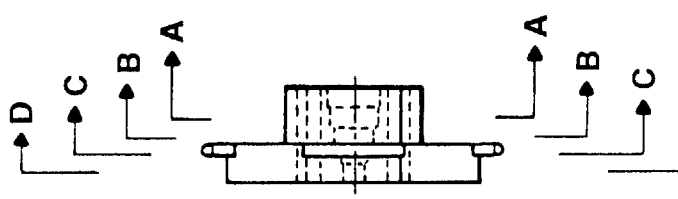
Figure 2H
Figure 2C
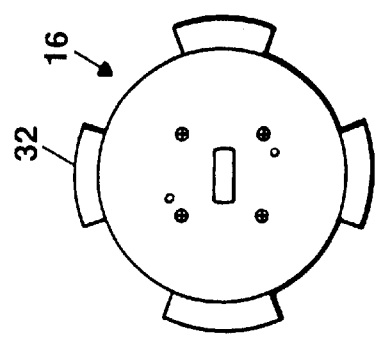
Figure 2B
 Figure 2G SECTION D-D
 Figure 2F SECTION C-C
 Figure 2E SECTION B-B
 Figure 2D SECTION A-A

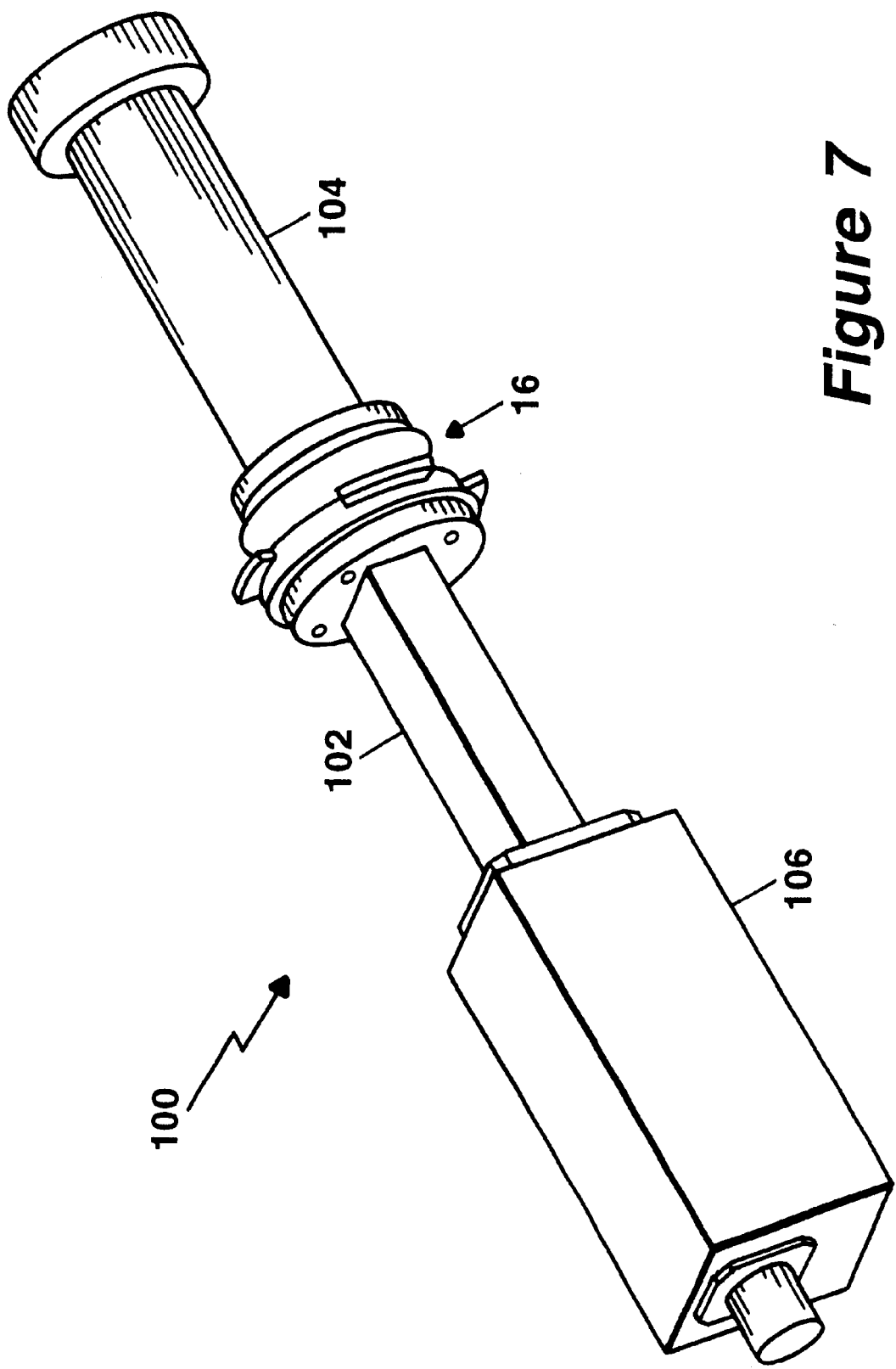

LOCKING ASSEMBLY

CROSS-REFERENCE TO RELATED APPLICATIONS

This application claims priority under 35 U.S.C. §119(e) to U.S. Provisional Patent Application No. 60/135,459 entitled "Locking Assembly," filed on May 24, 1999, which is incorporated herein by reference in its entirety.

STATEMENT REGARDING FEDERALLY FUNDED RESEARCH

Not applicable.

BACKGROUND OF THE INVENTION

Antenna systems utilize feed devices for coupling RF signals to and from the antenna. A feed device generally includes a waveguide structure and may also include electronic components for processing the RF signals. For proper operation, it is necessary that the RF feed be precisely aligned with components of the antenna, such as reflectors.

Antenna systems and feed devices are designed for operation at a particular frequency. Typically, the feed device is permanently secured to the antenna support structure.

SUMMARY OF THE INVENTION

In accordance with the invention, a locking assembly is provided. The locking assembly is adapted to be mounted to apparatus for the purpose of engaging and locking a device with respect to the apparatus. The locking assembly includes a mounting ring having at least one notch and at least one groove having an entrance adjacent to the notch. The locking assembly further includes a locking ring having at least one protrusion disposed in the notch of the mounting ring and a retaining ring for holding the locking ring and the mounting ring together.

The locking ring is normally biased toward a first, locking position in which the protrusion blocks the entrance to the groove of the mounting ring. The locking ring is moveable to a second, engagement position in which the protrusion is urged against the mounting ring to expose the entrance of the groove in order to permit a device to engage and become interlocked with the mounting ring and also to permit the device to be disengaged from the mounting ring.

The mounting ring of the locking assembly is capable of engaging and interlocking with various types of devices having at least one tab. The device is engaged by, and interlocked with respect to the mounting ring by urging the tab of the device against the locking ring protrusion in order to move the locking ring to the engagement position and by subsequent rotation of the device relative to the mounting ring in order to cause the tab to enter the groove of the mounting ring. Once the tab is positioned in the groove, the locking ring protrusion is again biased to the locking position in which the protrusion blocks the groove entrance, thereby preventing the device from being removed.

The device can be quickly and easily unlocked and disengaged from the locking assembly by depressing a finger tab of the locking ring which causes the locking ring to move to the engagement position in which the entrance to the mounting ring groove is exposed. Subsequent rotation of the device until the device tab is aligned with the notch of the mounting ring permits the device to be disengaged from the locking assembly.

In one illustrative embodiment, the locking assembly is mounted to a support structure of an antenna system and is adapted to receive and interlock with an RF feed to the antenna system. With this arrangement, a versatile antenna system is provided with which different feed assemblies can be used, and easily removed and replaced. By removing one feed assembly from the antenna and replacing it with another, different frequencies can be used to operate the system. The locking assembly advantageously holds the feed in precise alignment with respect to the antenna system. Further, use of the locking assembly does not require tools and can be done manually, with one hand. Thus, the locking assembly is suitable for changing RF feeds in antenna systems located in hard to reach places, such as high above a ship's deck on a mast.

BRIEF DESCRIPTION OF THE DRAWINGS

The foregoing features of this invention, as well as the invention itself, may be more fully understood from the following description of the drawings in which:

FIG. 2B is a top view of the device of FIG. 2;

FIG. 2C is a side view of the device of FIG. 2;

FIG. 2D is a cross-sectional view of the device taken along line A—A of FIG. 2C;

FIG. 2E is a cross-sectional view of the device taken along line B—B of FIG. 2C;

FIG. 2F is a cross-sectional view of the device taken along line C—C of FIG. 2C;

FIG. 2G is a cross-sectional view of the device taken along line D—D of FIG. 2C;

FIG. 2H is a bottom view of the device of FIG. 2;

FIG. 2I is a cross-sectional view of the device taken along line E—E of FIG. 2H;

FIG. 7 is an isometric view of an illustrative RF feed assembly including an RF feed device having features like the device of FIG. 2.

DETAILED DESCRIPTION OF THE INVENTION

Figure 1:
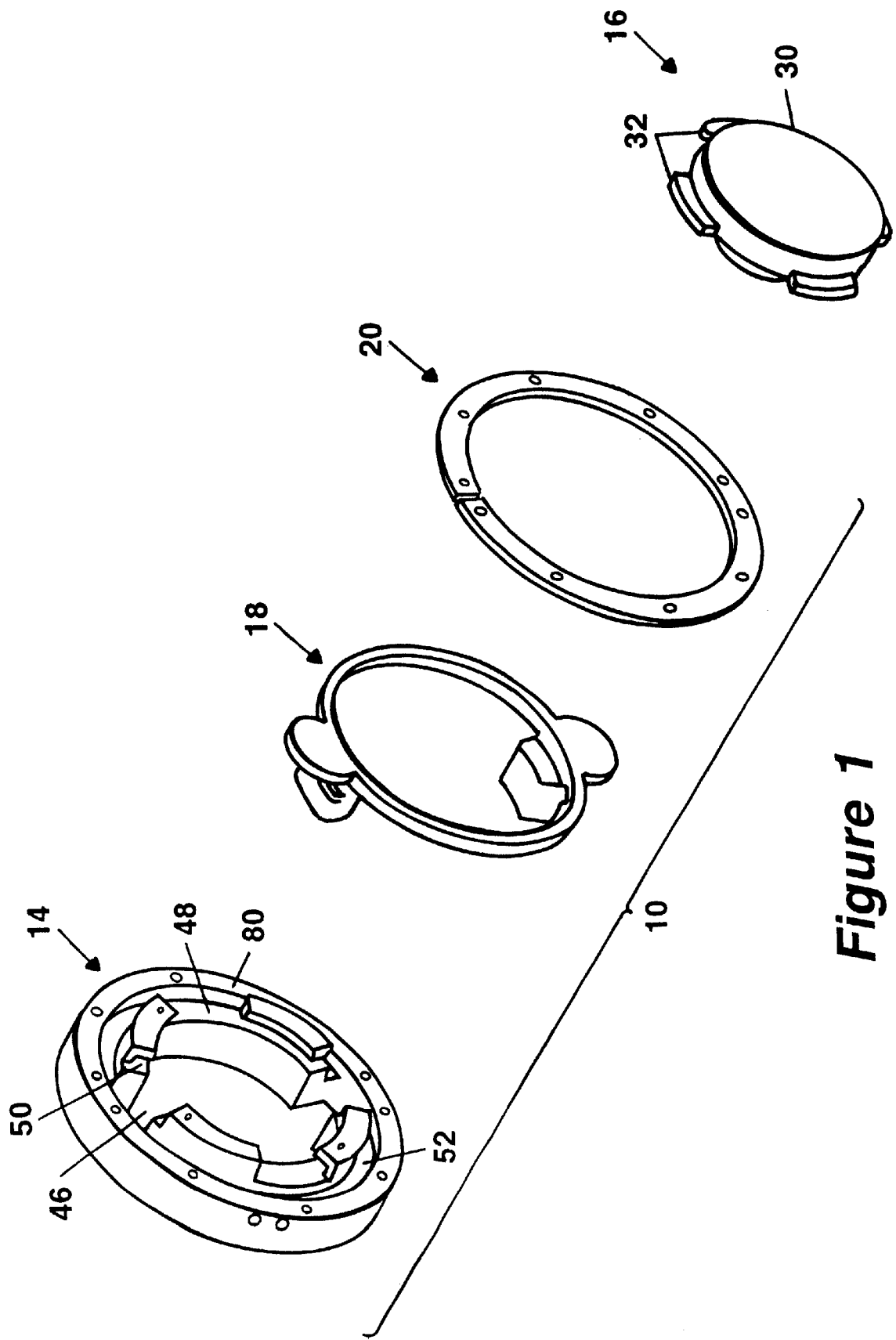
FIG. 1 is an exploded view of a locking assembly according to the present invention.

Referring to FIG. 1, a locking assembly 10 adapted for being mounted to apparatus for the purpose of engaging and locking a device 16 with respect to the apparatus includes a mounting ring 14, a locking ring 18 and a retaining ring 20. Various types of devices 16 having at least one tab 32 are suitable for being engaged and locked with respect to the locking assembly. Advantageously, the locking assembly 10 enables quick and easy engagement, locking, unlocking, and disengagement of the device 16 with one hand and without requiring the use of tools, as will become apparent. The locking assembly 10 further locks the device 16 in precise alignment with respect to the mounting ring 14 and thus, also with respect to the apparatus to which the mounting ring is mounted.

Figure 8:
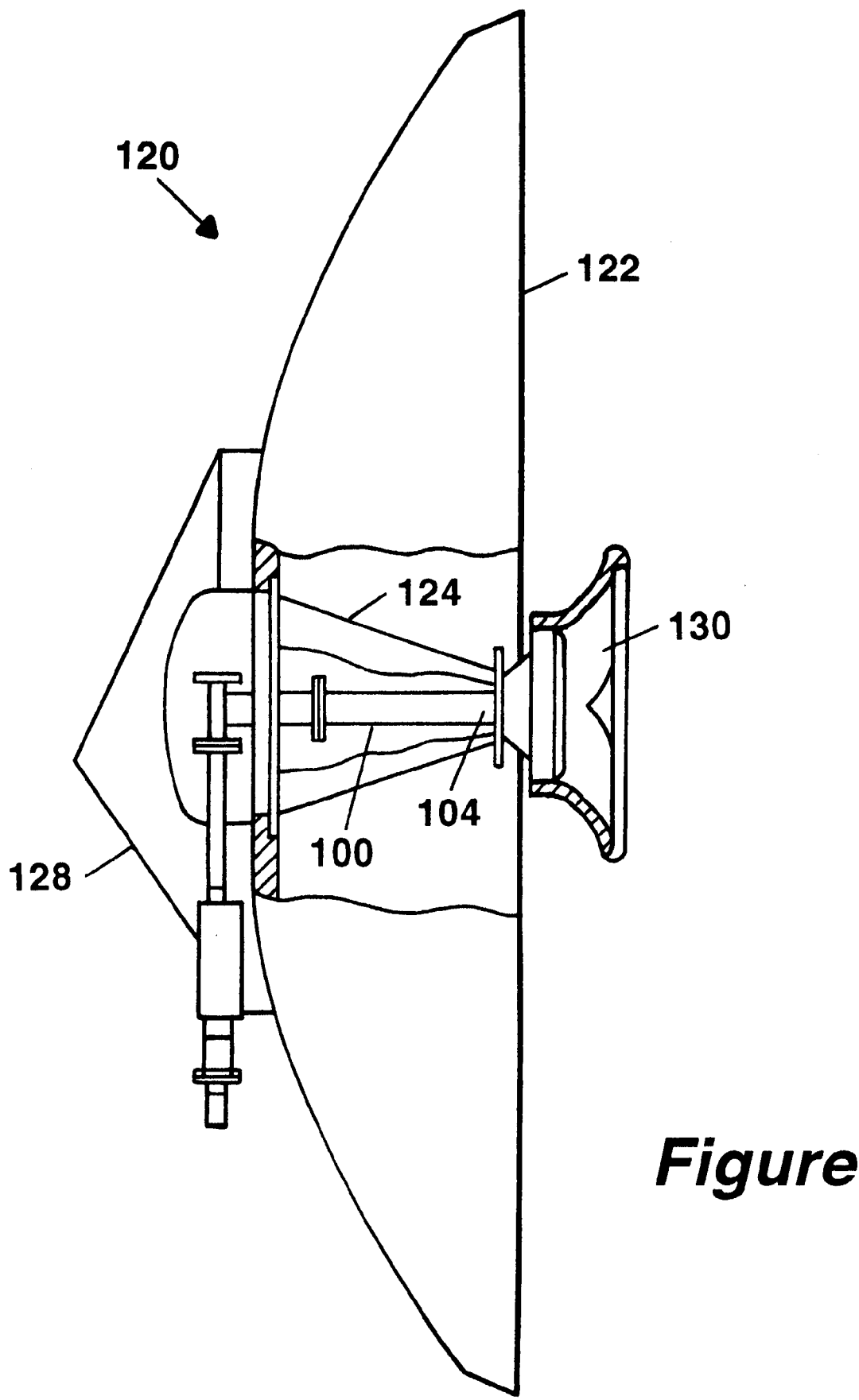
FIG. 8 is a diagram of an antenna system including the locking assembly of FIG. 1 for engaging and locking the RF feed assembly of FIG. 7.

In one illustrative embodiment shown in FIG. 8, the locking assembly 10 is mounted to an antenna system and the device 16 intended for attachment to the antenna system by the locking assembly is an RF feed assembly 100 (FIG. 7). It will be appreciated by those of ordinary skill in the art however, that the locking assembly 10 is advantageous for use in a multitude of applications in which it is desired to lock a device into engagement with a structure in precise alignment and in a manner which permits fast and easy removal and replacement of the device without the use of tools and preferably requiring only one hand to do so.

Figure 2A:
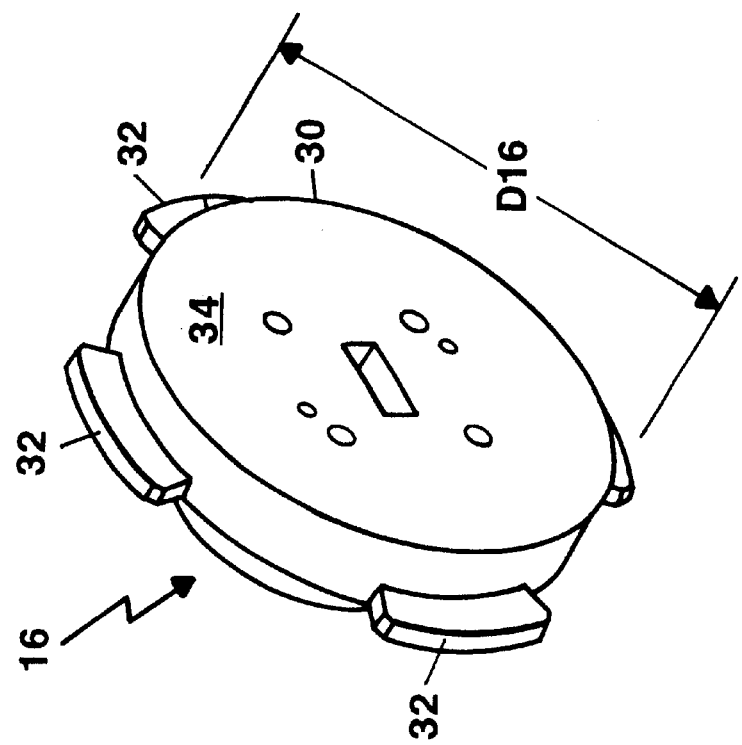
FIG. 2A is an alternate isometric view of the device of FIG. 2.
Figure 2:
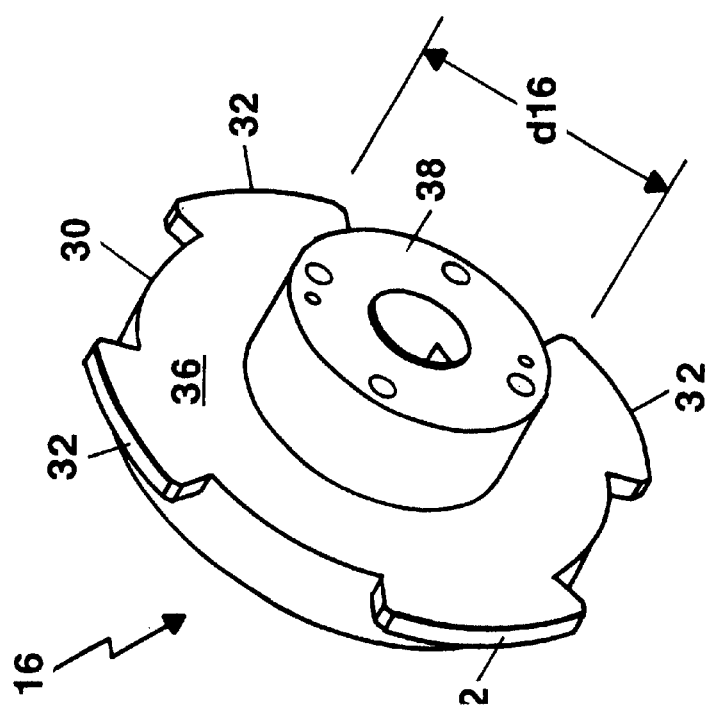
FIG. 2 is an isometric view of a device suitable for being engaged and locked by the locking assembly of FIG. 1.

Referring also to FIGS. 2–2I, an illustrative device 16 suitable for engagement by the locking assembly 10 is shown. The illustrative device 16 includes a housing 30 in which an RF feed structure, such as a waveguide, can be provided. In the illustrative embodiment, the device 16 comprises part of a feed assembly 100 shown and described below in conjunction with FIG. 7. In particular, the feed device 16 provides a square-to-round transition portion of the RF feed assembly 100.

The device 16 includes a plurality of radially spaced, protruding tabs 32, as shown. Each of the tabs 32 has dimensions complementary with respect to a corresponding groove 50 of the mounting ring 14 (FIG. 3A), in order to permit the tabs to mate with the respective mounting ring groove in use, as will be described.

At least a portion of the device 16 is disposed in a central aperture 54 of the mounting ring 14 (FIG. 3) in order to permit engagement. In some applications, the device 16 may extend through the central aperture 54. As shown in FIG. 2A, a first surface 34 of the device 16 has an outer diameter D16 and, as shown in FIG. 2, the second, opposite surface 36 of the device 16 has a protruding annular portion 38 with a diameter d16. These diameters are smaller than the diameter of the central aperture 54 of the mounting ring 14, permitting the device 16 to extend through the mounting ring aperture 54.

The tabs 32 may include a key feature to ensure that the device 16 is aligned in a predetermined manner with respect to the locking assembly 10 and thus, with respect to the apparatus to which the locking assembly is attached. One suitable keying scheme is to provide one of the tabs 32 with a different size than the other tabs and to provide a corresponding one of the mounting ring grooves with a complementary different size with respect to the others. Alternatively or additionally, it may be desirable to provide a visual indicator on the device 16 and on the locking assembly in order to assist in mounting the device to the locking assembly with a predetermined alignment, as will become apparent.

Some features of the device 16 are a function of the illustrated RF feed embodiment. In particular, the exterior and interior features and dimensions of the housing 30 of the feed 16 shown in FIGS. 2–2G are provided for the purpose of forming an RF waveguide providing a square-to-round transition. The RF feed housing 30 may be comprised of various materials, such as aluminum, copper, or steel and typically is a machined part.

Figure 3A:
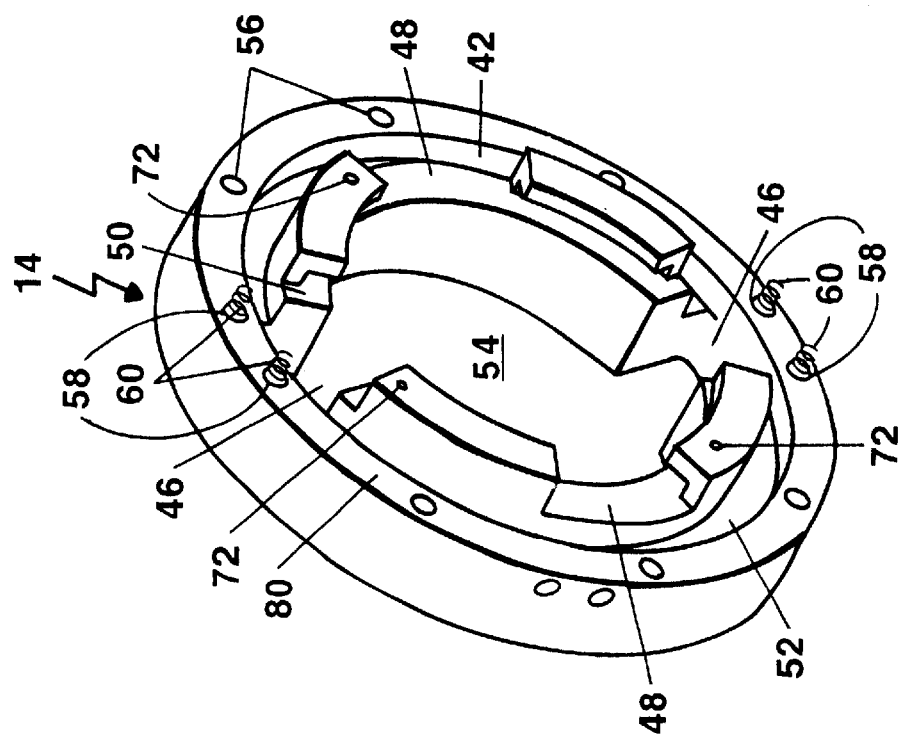
FIG. 3A is an alternate isometric view of the mounting ring of FIG. 3.
Figure 3:
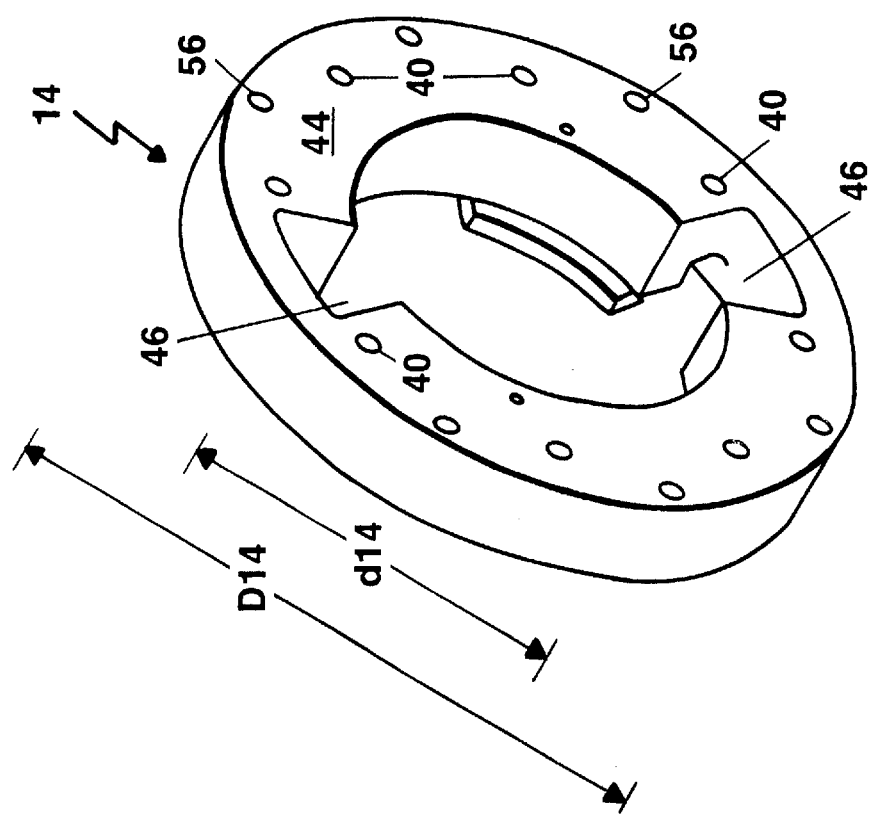
FIG. 3 is an isometric view of a mounting ring of the locking assembly of FIG. 1.
Figure 3D:
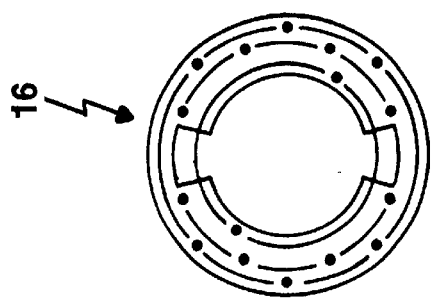
FIG. 3D is a bottom view of the mounting ring of FIG. 3.
Figure 3C:
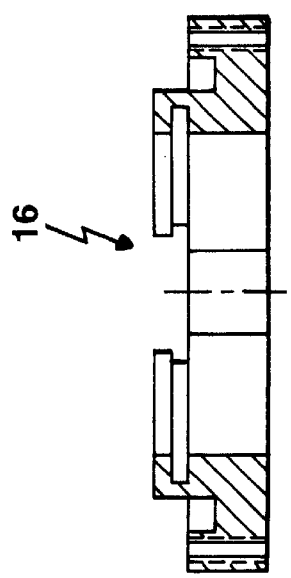
FIG. 3C is a cross-sectional view of the mounting ring taken along line A—A of FIG. 3B.
Figure 3E:
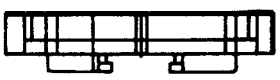
FIG. 3E is a side view of the mounting ring of FIG. 3.
Figure 3B:
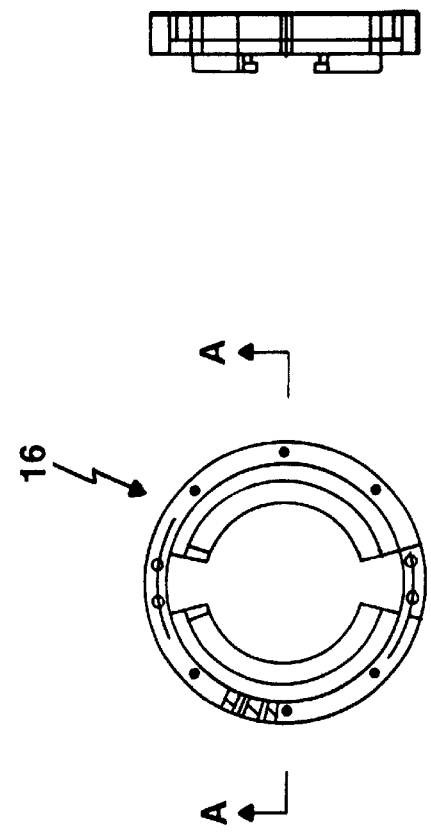
FIG. 3B is a top view of the mounting ring of FIG. 3.

Referring also to FIGS. 3–3E, the mounting ring 14 of the locking assembly 10 is shown. The mounting ring 14 is adapted for being secured to the structure to which the device 16 is intended to be mounted. In the illustrative antenna embodiment of FIG. 8, the mounting ring 14 is attached to a support structure of an antenna system, as will be described below. A fastening mechanism is provided on the mounting ring 14 for coupling the mounting ring to the support structure. In the illustrative embodiment, the fastening mechanism is provided by screw holes 40 (FIG. 3) through the mounting ring and screws (not shown). However, it will be appreciated by those of ordinary skill in the art that various fastening mechanisms are suitable.

The mounting ring 14 further includes a second fastening mechanism for fastening to the retaining ring 20 to the mounting ring in order to moveably couple the locking ring 18 to the mounting ring 14. In the illustrative embodiment, the retaining ring fastening mechanism is provided in the form of screw holes 56 (FIGS. 3 and 3A) and screws (not shown). Again, various fastening schemes are suitable.

The mounting ring 14 has a first surface 44 which is substantially flat and a second, opposite surface 42 having several features. In particular, the surface 42 has a plurality of notches, two of which 46 extend through to the opposite surface 44 of the mounting ring (as is apparent from FIG. 3) and two of which 48 terminate at ledges. The notches 46 which extend through the mounting ring 14 are adapted to receive wedge-shaped protrusions 70 of the locking ring 18 (FIG. 4) in assembly. Thus, the notches 46 have a complementary size and shape with respect to the mounting ring protrusions 70. During engagement of the device 16 with the mounting ring 14, the tabs 32 protruding radially from the device 16 are received by a respective one of notches 46, 48. Thus, the tabs 32 have a complementary width with respect to the respective notch. An annular channel 52 in the surface 42 of the mounting ring 14 receives an annular portion 82 (FIG. 4) of the locking ring 18 in assembly, as will become apparent.

Also provided on the surface 42 of the mounting ring 14 are undercut portions which form grooves 50, as shown. Each of the grooves 50 has an entrance adjacent to, or in, a respective notch 46, 48. In order to lock the device 16 to the mounting ring 14, the tabs 32 of the device 16 are received by the grooves 50. Thus, the tabs 32 have complementary dimensions (e.g., thickness) with respect to the respective groove 50. The inner diameter d14 defining the central aperture 54 of the mounting ring 14 (FIG. 3) is slightly larger than the outer diameter D16 of the device 16 (FIG. 2A) in order to permit the device to extend, at least partially, into the central aperture of the mounting ring 14.

The mounting ring 14 includes a plurality of depressions 58 in which compressible members, such as springs 60, are located in order to bias the locking ring 18 toward its first, normally locked position, as will be described. The springs 60 are radially aligned with the notches 46, as shown. Suffice it here to say that the springs 60 push against finger tabs 78 of the locking ring 18 in order to bias the locking ring toward the locked position.

The mounting ring 14 may be comprised of various materials, such as hard coated anodized aluminum, and is machined to provide the above-described features. Aluminum is particularly desirable due to its light weight. However, it will be appreciated by those of ordinary skill in the art that various materials and manufacturing techniques may be used to provide the mounting ring.

Figure 4A:
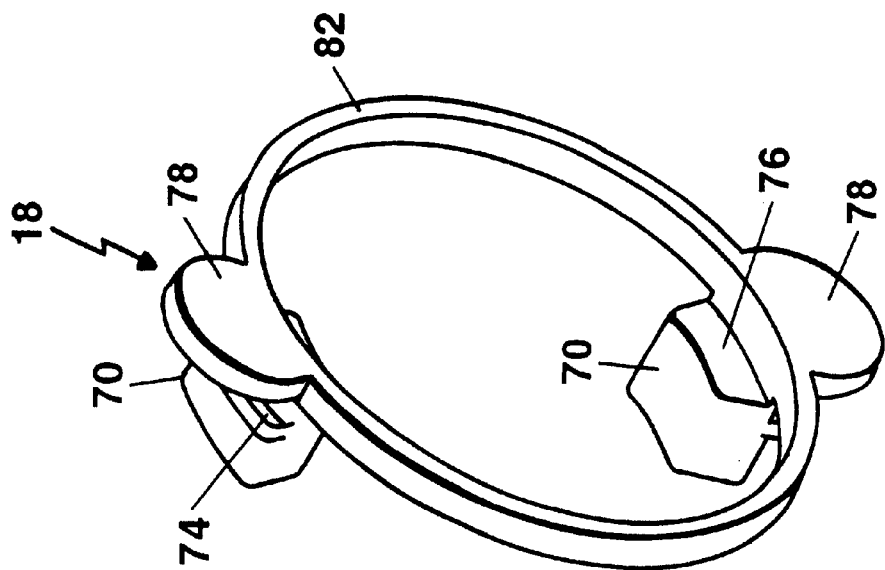
FIG. 4A is an alternate isometric view of the locking ring of FIG. 4.
Figure 4:
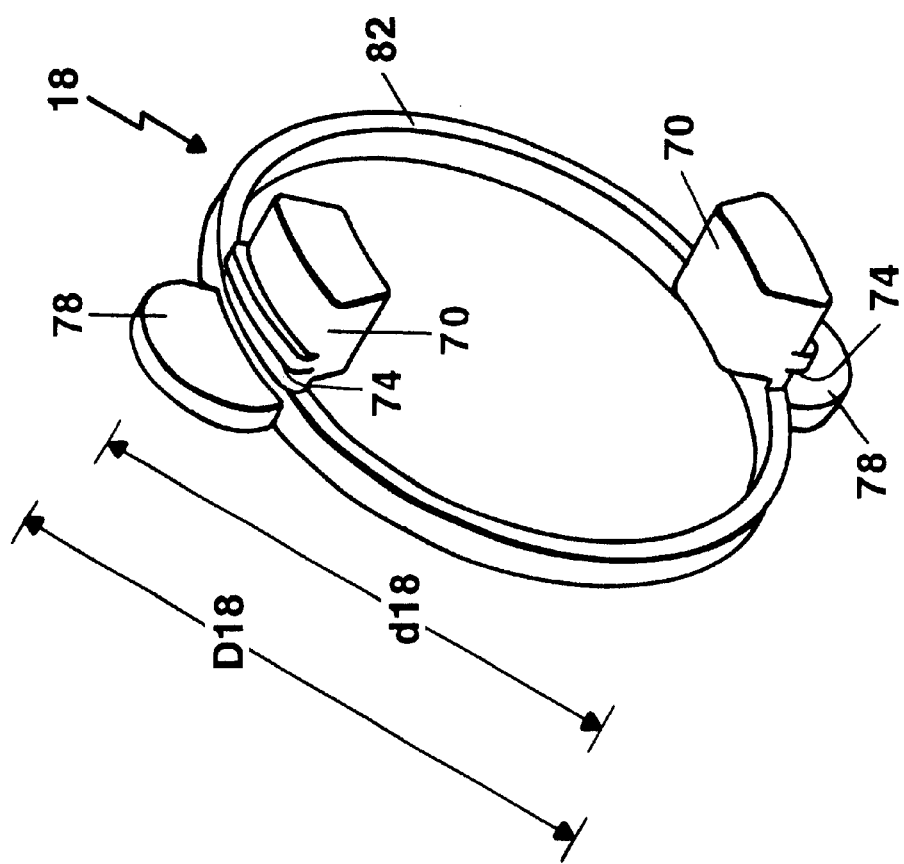
FIG. 4 is an isometric view of a locking ring of the locking assembly of FIG. 1.
Figure 4D:
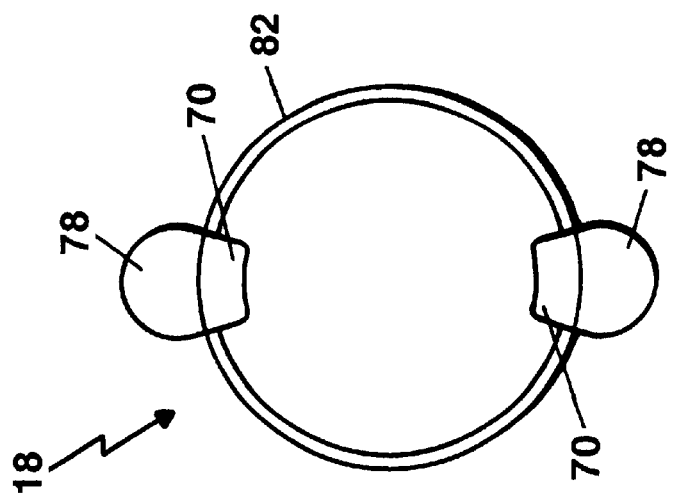
FIG. 4D is a bottom view of the locking ring of FIG. 4.
Figure 4C:
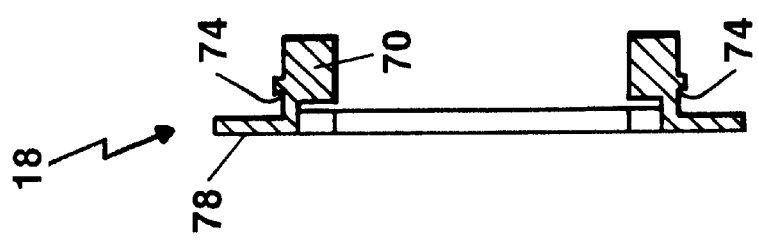
FIG. 4C is a side view of the locking ring of FIG. 4.
Figure 4B:
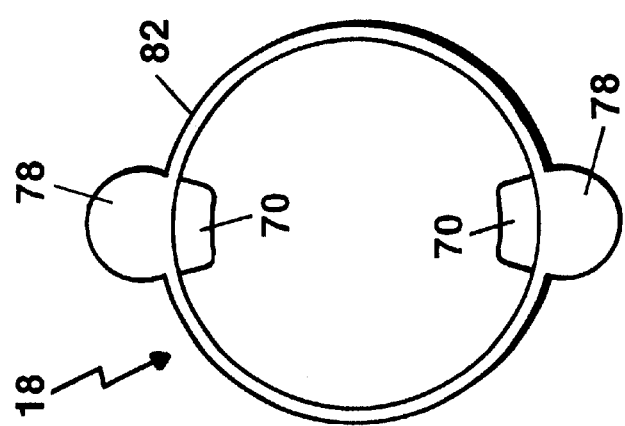
FIG. 4B is a top view of a locking ring of FIG. 4.

Referring also to FIGS. 4–4D, the locking ring 18 has an annular portion 82 having an outer diameter D18 and inner diameter d18 and further has a plurality of wedge-shaped protrusions 70, each of which has a surface forming a ledge 76 (FIG. 4A) against which a tab 32 of the device 16 is positioned and a lip 74 for receiving the retaining ring 20 in use, as will be described. The locking ring 18 further has a plurality of finger tabs 78 extending radially outward from the annular portion 82 adjacent to a respective protrusion 70.

The locking ring 18 is secured to the mounting ring 14 by the retaining ring 20. The locking ring 18 is adapted for being in a first, locking position in which the wedge-shaped protrusions 70 block the entrance to mounting ring grooves 50 or in a second, engagement position in which the protrusions 70 are moved out of the way of the groove entrances. In the engagement position, the device 16 can be rotated with respect to the mounting ring in order to permit each of the tabs 32 to enter a respective groove 50; whereas, in the locking position, the protrusions 70 prevent the tabs 32 of the device 16 from leaving the grooves 50. As will become apparent, the second, engagement position also serves as a disengagement position.

The locking ring diameters D18 and d18 are selected to permit the annular portion 82 to be received in the annular channel 52 of the mounting ring 14. The protrusions 70 are received by respective notches 46 in the mounting ring 14, with the finger tabs 78 extending over an outer annular portion 80 of the mounting ring 14 above the springs 60 (FIG. 3A).

In the illustrative embodiment, the locking ring 18 is comprised of hard coated anodized aluminum formed by machining. However, it will be appreciated by those of ordinary skill in the art that various materials and manufacturing techniques may be used to provide the locking ring.

Figure 5:
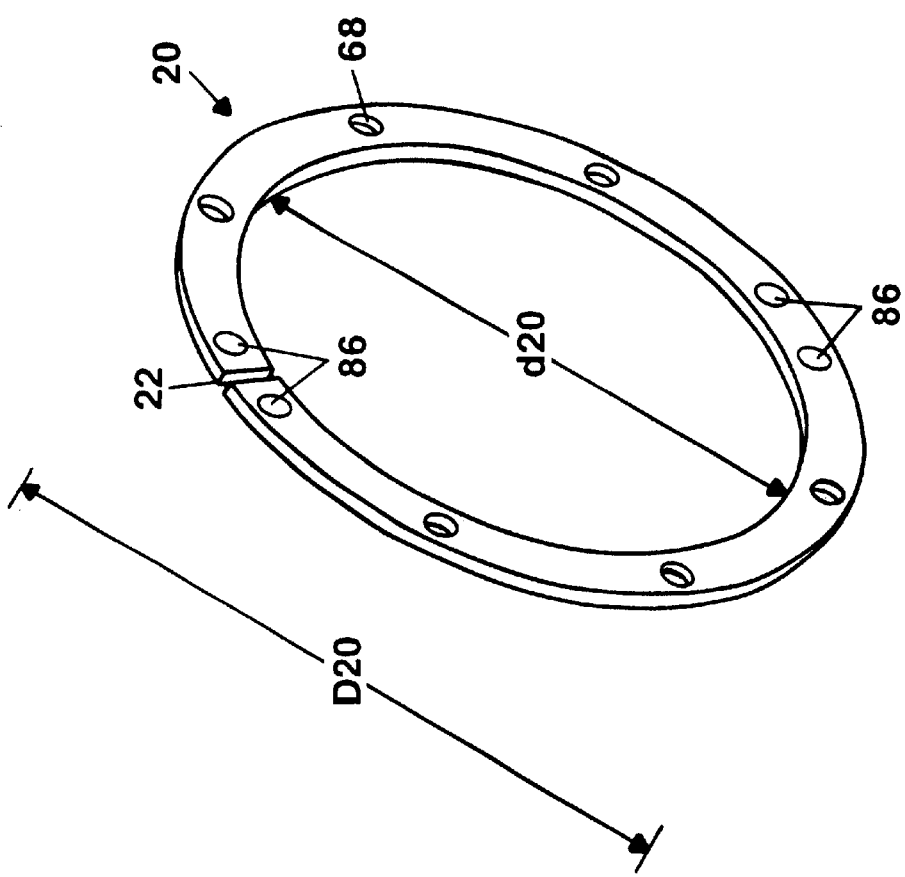
FIG. 5 is an isometric view of a retaining ring of the locking assembly of FIG. 1.
Figures 5A, 5B:
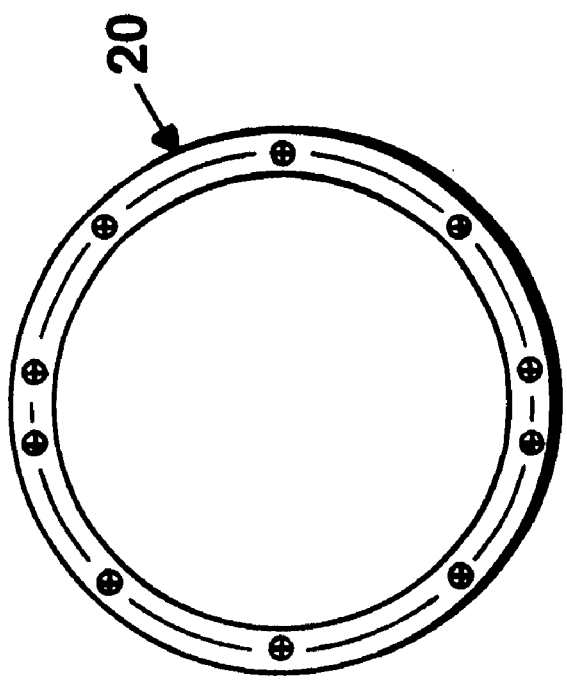
FIG. 5A is a plan view of the retaining ring of FIG. 5.
FIG. 5B is a side view of the retaining ring of FIG. 5.

Referring also to FIGS. 5–5B, the annular retaining ring 20 has a break 22 and an outer diameter D20 which is substantially equal to the outer diameter D14 of the mounting ring 14. Further, the retaining ring 20 has holes 68 which are complimentarily shaped and positioned with respect to the holes 56 in the mounting ring 14 and through-holes 86 which are aligned with depressions 58 in the mounting ring 14.

The retaining ring 20 is comprised of a material capable of permitting the ring to be slightly opened during assembly. Suitable materials for the retaining ring include any metal, such as aluminum, and the retaining ring may be formed by various manufacturing techniques, such as machining or other suitable processes.

Assembly of the locking assembly 10 will now be described. The annular portion 82 of the locking ring 18 is placed in the annular groove 52 of the mounting ring 14 such that the locking ring protrusions 70 are aligned with the mounting ring notches 46 and the finger tabs 78 extend over the annular portion 80 of the mounting ring. The retaining ring 20 is then opened slightly and seated over the lip 74 of the locking ring protrusions and the annular portion 80 of the mounting ring, with the retaining ring mounting holes 68 aligned with the mounting ring mounting holes 56 and the retaining ring through-holes 86 aligned with springs 60. The retaining ring is then secured to the mounting ring with hardware. The locking ring 18 is coupled to the mounting ring 14 by interference between the lip 74 of the protrusions 70 and the retaining ring 20 which is secured to the mounting ring. Further, the locking ring 18 is biased by the springs 60 toward its first, locking position and can be urged toward the mounting ring to its second, engagement position, in which the protrusions 70 are positioned deeper within the respective notch 46.

When it is desired to mount a device 16 to the locking assembly 10, the device is brought into alignment with the assembly 10 so that two tabs 32 of the device are aligned with the locking ring ledges 76 and two tabs 32 of the device are aligned with the mounting ring notches 48. As noted above, a visual indicator on the mounting ring and device 16 and/or a keying scheme may be used to ensure a predetermined alignment between the device and the assembly 10.

Figure 6:
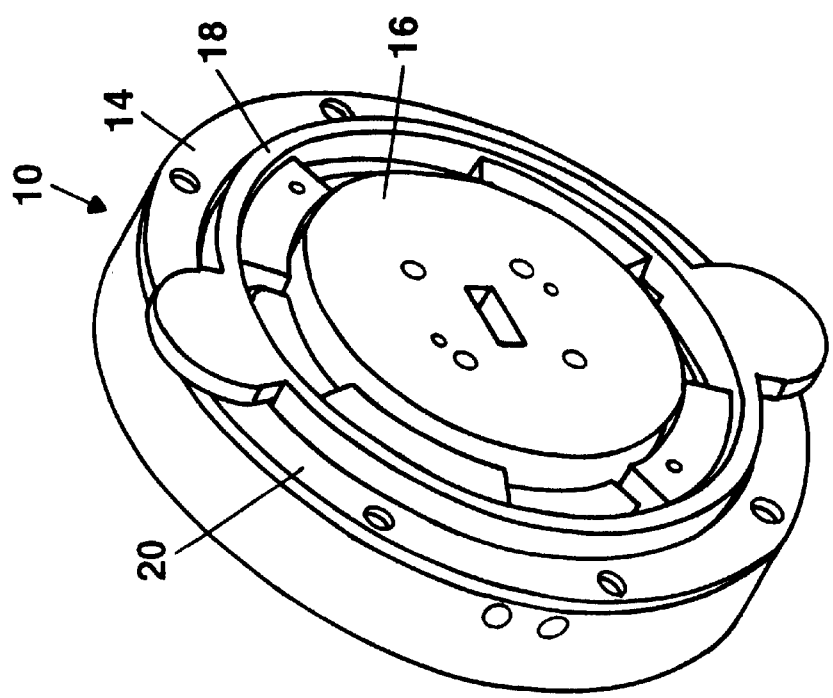
FIG. 6 is an isometric view of the locking assembly of FIG. 1 engaging the device of FIG. 2.

The device 16 is then urged against the locking ring 18 which causes the springs 60 to compress and the locking ring to move from the first, locking position to the second, engagement position. With the locking ring in the engagement position, the device 16 is rotated relative to the assembly 10. More particularly, tabs 32 of the device 16 enter and are rotated into grooves 50 in the mounting ring. At least one stop pin 72 (FIG. 3A) is provided through at least one groove 50 of the mounting ring in order to permit rotation of the device 16 relative to the locking assembly in only one direction and in order to limit the amount of rotation of the device 16 relative to the locking assembly 10. In the illustrative embodiment, a plurality of stop pins 72 are provided as shown and the device 16 can be rotated approximately 35°. Note that FIG. 6 shows the position of the device 16 relative to the locking assembly 10 prior to rotation of the device.

Once the tabs 32 are positioned in the grooves 50 of the mounting ring, the wedge-shaped protrusions 70 are biased by the springs 60 back to the first, locking position. In this position, the protrusions 70 block the entrances to the grooves 50, thereby preventing the device 16 from being rotated back to a disengageable position so that the tabs 32 cannot be aligned with the mounting ring notches 46, 48. In this way, the device 16 is locked in place with respect to the assembly 10.

With the above-described arrangement, the device 16 is provided in repeatable, precise alignment with respect to the locking assembly 10 and thus, with respect to the structure to which the locking assembly is secured. In the illustrative embodiment, the rotational tolerance of the device 16 with respect to the locking assembly 10 is on the order of +/−0.1° and the radial tolerance is on the order of +/−0.003 inches.

The device 16 can be readily unlocked and disengaged from the locking assembly 10 with one hand as follows. The finger tabs 78 of the locking ring 18 are pressed against the mounting ring 14 which causes the wedge-shaped protrusions 70 to move further down into the notches 46. Such biasing of the locking ring 18 to the engagement position exposes the entrances to the mounting ring grooves 50 and enables the device 16 to be rotated back to the position shown in FIG. 6, with the tabs 32 aligned with the notches 46, 48. In this position, the device 16 can be removed from the mounting ring 14, following which the locking ring 18 will be biased again, by the springs 60, to the first, locking position.

Referring also to FIG. 7, one illustrative RF feed assembly 100 is shown to include an RF feed of the form of the device 16 shown in FIGS. 2–2I. The feed assembly 100 further includes a waveguide structure comprising a filter portion 102 having a square cross-section and a feedhorn 104 having a round cross-section. The feed device 16 provides a round-to-square transition (see FIG. 2I). Electronic components, such as the illustrated low noise block (LNB) 106, may also form part of the feed assembly 100.

Referring also to FIG. 8, an illustrative antenna system 120 suitable for utilizing the locking assembly 10 of the present invention to mount the RF feed assembly 100 of FIG. 7 is shown. The antenna system includes a main reflector 122 to which a support structure 124 is coupled. The support structure 124 is adapted to support the feed assembly 100, as shown. Thus, the mounting ring 14 of the locking assembly 10 is secured to the support structure 124, such as with the use of hardware and screw holes 40 (FIG. 3). When the feed assembly 100 (FIG. 7) is engaged and locked by the locking assembly 10, the feed assembly feedhorn 104 is positioned adjacent to a sub-reflector 130. A mounting interface 128 is provided for mounting the antenna system 120 to a pedestal (not shown). A radome (not shown) typically covers the antenna system 120 and may be provided with an aperture, or hatch through which a person can reach in order to remove and replace the feed assembly 100 in the manner described above.

Having described the preferred embodiments of the invention, it will now become apparent to one of ordinary skill in the art that other embodiments incorporating their concepts may be used.

It will be appreciated by those of ordinary skill in the art that various modifications to the described locking assembly are possible without departing from the spirit of the invention. For example, the number and radial spacing of the device tabs and respective mounting ring notches may be readily varied to suit a particular application.

As noted above, it will be appreciated by those of ordinary skill in the art that the locking assembly 10 of the present invention is advantageous for use with any system requiring accurate alignment and quick installation and removal of equipment. For example, transits or cameras can be assembled to tripods using the locking assembly described herein.

It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A locking assembly adapted to lock an element having at least one tab in a fixed position comprising:
   a mounting ring having at least one notch and at least one groove adapted to receive said at least one tab of said element and having an entrance disposed adjacent to said notch; and
   a locking ring movably attached to said mounting ring and having at least one protrusion disposed in said at least one notch of said mounting ring, said locking ring adapted for being in a first, locking position in which said protrusion blocks said entrance to said groove and prevents said at least one tab of said element from exiting said groove and for being in a second, engagement position in which said entrance to said groove is exposed to permit said at least one tab of said element to be inserted into said groove.

2. The locking assembly of claim 1 further comprising a retaining ring for attaching said locking ring to said mounting ring.

3. The locking assembly of claim 1 further comprising at least one compressible member attached to said mounting ring for biasing said locking ring toward said first, locking position.

4. The locking assembly of claim 1 wherein said locking ring further comprises at least one finger tab adapted for being urged against said mounting ring in order to move said locking ring to said second, engagement position.

5. A method for engaging and locking a device having at least one tab, said method comprising the steps of:
   aligning said at least one tab of said device with at least one protrusion of a locking ring attached to a mounting ring;
   moving said locking ring from a first position in which said at least one protrusion blocks an entrance to a groove in said mounting ring to a second position in which said entrance to said groove is exposed; and
   rotating said device relative to said mounting ring to cause said at least one tab of said device to enter said groove, wherein said locking ring returns to said first position once said at least one tab of said device is disposed in said groove.

6. The method of claim 5 further comprising the step of biasing said locking ring toward said first position.

7. The method of claim 5 wherein said moving step includes the step of urging at least one finger tab of said locking ring toward said mounting ring to move said locking ring from said first position to said second position.

8. The method of claim 7 wherein said finger tab urging step includes the step of compressing at least one compressible member attached to said mounting ring.

9. The method of claim 5 further comprising the step of attaching said locking ring to said mounting ring with a retaining ring.

10. An antenna having comprising:
    a support structure;
    a locking assembly comprising a mounting ring attached to said support structure and a locking ring, said mounting ring having at least one notch and at least one groove having an entrance disposed adjacent to said notch and said locking ring having at least one protrusion disposed in said at least one notch of said mounting ring, said locking ring axially movable along an axis substantially perpendicular to the plane of said mounting ring and adapted for being in a first, locking position in which said protrusion blocks said entrance of said groove and for being in a second, engagement position in which said entrance to said groove is exposed; and
    an RF feed assembly having at least one tab adapted to be disposed in said groove.

11. The antenna of claim 10 wherein said locking assembly further comprises a retaining ring for attaching said locking ring to said mounting ring.

12. The antenna of claim 10 wherein said locking assembly further comprises at least one compressible member attached to said mounting ring for biasing said locking ring toward said first, locking position.

13. The antenna of claim 10 wherein said locking ring further comprises at least one finger tab adapted for being urged against said mounting ring in order to move said locking ring to said second, engagement position.

14. A method of locking an RF feed to an antenna, comprising the steps of:

attaching a mounting ring to a support structure of said antenna;

aligning a tab of said RF feed with a protrusion of a locking ring attached to a mounting ring;

moving said locking ring from a first position in which said protrusion blocks an entrance to a groove in said mounting ring to a second position in which said entrance to said groove is exposed; and rotating said RF feed relative to said mounting ring to cause said tab of said RF feed to enter said groove, wherein said locking ring returns to said first position once said tab is disposed in said groove.

15. The method of claim 14 further comprising the step of biasing said locking ring toward said first position.

16. The method of claim 14 wherein said moving step includes the step of urging a finger tab of said locking ring toward said mounting ring to move said locking ring from said first position to said second position.

17. The method of claim 16 wherein said finger tab urging step includes the step of compressing at least one compressible member of said mounting ring.

18. The method of claim 14 further comprising the step of attaching said locking ring to said mounting ring with a retaining ring.

19. A locking assembly comprising:

a mounting ring having at least one notch and at least one groove having an entrance disposed adjacent to said notch; and a locking ring axially movable along an axis substantially perpendicular to the plane of said mounting ring and having at least one protrusion disposed in said at least one notch of said mounting ring, said locking ring adapted for being in a first, locking position in which said protrusion blocks said groove and for being in a second, engagement position in which said entrance to said groove is exposed.

20. The locking assembly of claim 19 further comprising at least one compressible member attached to said mounting ring for biasing said locking ring toward said first, locking position.

21. The locking assembly of claim 19 wherein said locking ring further comprises at least one finger tab adapted for being urged against said mounting ring in order to move said locking ring to said second, engagement position.

22. A locking assembly adapted to lock an element having at least one tab in a fixed position comprising:

a mounting ring having at least one notch and at least one groove having an entrance disposed adjacent to said notch; and a locking ring movably attached to said mounting ring and having at least one protrusion disposed in said at least one notch of said mounting ring, said locking ring adapted for being in a first, locking position in which said protrusion blocks said groove and for being in a second, engagement position in which said entrance to said groove is exposed, wherein said element is locked in said fixed position by rotating said element relative to said locking ring and said mounting ring once said locking ring is moved to said second position.

23. The locking assembly of claim 22 further comprising at least one compressible member attached to said mounting ring for biasing said locking ring toward said first, locking position.

24. The locking assembly of claim 22 wherein said locking ring further comprises at least one finger tab adapted for being urged against said mounting ring in order to move said locking ring to said second, engagement position.

* * * * *